United States Patent
Thomas

(10) Patent No.: US 9,552,607 B2
(45) Date of Patent: Jan. 24, 2017

(54) SYSTEMS AND METHODS FOR SELLING SOUNDS

(71) Applicant: Beatport, LLC, Denver, CO (US)

(72) Inventor: Matthew Thomas, Denver, CO (US)

(73) Assignee: Beatport, LLC, Denver, CO (US)

( * ) Notice: Subject to any disclaimer, the term of this patent is extended or adjusted under 35 U.S.C. 154(b) by 700 days.

(21) Appl. No.: 13/802,585

(22) Filed: Mar. 13, 2013

(65) Prior Publication Data

US 2013/0254076 A1 Sep. 26, 2013

Related U.S. Application Data

(60) Provisional application No. 61/613,730, filed on Mar. 21, 2012.

(51) Int. Cl.
*G06Q 30/00* (2012.01)
*G06Q 30/06* (2012.01)

(52) U.S. Cl.
CPC ...... *G06Q 30/0641* (2013.01); *G06Q 30/0631* (2013.01)

(58) Field of Classification Search
CPC G06Q 30/00; G06Q 30/0601; G06Q 30/0603; G06Q 30/0623; G06Q 30/0641
See application file for complete search history.

(56) References Cited

U.S. PATENT DOCUMENTS

| | | | | |
|---|---|---|---|---|
| 2001/0017829 A1* | 8/2001 | Inoue | ................ | G10H 1/0041 369/47.23 |
| 2002/0178074 A1* | 11/2002 | Bloom | ................ | G06Q 10/08 705/26.81 |
| 2004/0193642 A1* | 9/2004 | Allen | ................ | G06F 17/30017 |
| 2007/0124293 A1* | 5/2007 | Lakowske | ......... | G06F 17/30743 |
| 2007/0174274 A1* | 7/2007 | Kim | ................ | G06F 17/30743 |

(Continued)

FOREIGN PATENT DOCUMENTS

| EP | 2388721 | 11/2011 |
|---|---|---|
| KR | 100862616 | 10/2009 |

(Continued)

OTHER PUBLICATIONS

Geoffroy Peeters, Amaury La Burthe, Xaiver Rodet. Toward Automatic Music Audio Summary Generation from Signal Analysis. ISMIR, Oct. 2002, Paris, France.*

(Continued)

*Primary Examiner* — Jeffrey A Smith
*Assistant Examiner* — Christopher Seibert
(74) *Attorney, Agent, or Firm* — Lathrop & Gage LLP

(57) ABSTRACT

Systems and methods sell a sound file to a user of a digital audio workstation (DAW). A sound vendor receives the sound file from a sound creator and analyzes the sound file to automatically determine a beats-per-minute value and a musical key value. The sound file is stored, in association with the beats-per-minute value and the musical key value, within a database of the sound vendor. A web interface is generated to interact with the user to receive a search request defining at least one of the beats-per-minute value and the musical key value. The sound file is selected from the database based upon the search request, a financial agreement between the user and the sound creator is completed for sale of the sound file to the user, and the sound file is sent to the DAW.

10 Claims, 8 Drawing Sheets

(56) References Cited

U.S. PATENT DOCUMENTS

| | | | |
|---|---|---|---|
| 2009/0063574 A1* | 3/2009 | Kim | G06F 21/10 |
| 2009/0088877 A1* | 4/2009 | Terauchi | G10H 1/0025 |
| | | | 700/94 |
| 2010/0257005 A1 | 10/2010 | Phenner et al. | |
| 2011/0161305 A1* | 6/2011 | Safadi | G06F 17/30253 |
| | | | 707/706 |
| 2015/0046444 A1* | 2/2015 | Afkhami | G06F 17/30702 |
| | | | 707/732 |

FOREIGN PATENT DOCUMENTS

| | | |
|---|---|---|
| KR | 2010-0133177 | 12/2010 |
| WO | 2007053770 | 5/2007 |

OTHER PUBLICATIONS

PCT/US13/31758 International Search Report & Written Opinion dated Jun. 21, 2013, 12 pages.
Cano, P. et al., A Review of Audio Fingerprinting, Journal of VLSI Signal Processing 31, 271-284, 2005.
European Patent Application No. 13764747.5, Supplementary European Search Report and Opinion mailed Aug. 11, 2015, 7 pages.

\* cited by examiner

SYSTEMS AND METHODS FOR SELLING SOUNDS

RELATED APPLICATIONS

This application claims priority to U.S. Patent Application Ser. No. 61/613,730, filed Mar. 21, 2012, titled "Systems and Methods for Selling Sounds," and incorporated herein by reference.

BACKGROUND

A musician utilizes a digital audio workstation (DAW) to compose and create a sound track from a plurality of sound files. The musician typically searches for a CD or DVD containing a desired sound file that is produced by a sound creator. The CD or DVD has a written description (e.g., a title and cover description) that describes the sound files provided on the CD or DVD. The musician often purchases the CD or DVD for a single sound file and without even hearing the sound file. The purchase may be at a bricks-and-mortar store, requiring the musician to pay a visit to the store, or made online, wherein the musician must wait for the CD or DVD to be shipped and delivered before use. The creativity process is therefore interrupted. Further, other sound files on the CD or DVD may never be used by the musician. Even if the musician loads all purchased sound files from the CD or DVD into a local library, these sound files are not indexed or sorted and it is therefore difficult to find a desired sound.

A musician searching for a particular sound to include in a sound track typically searches manually through thousands of purchased sound files within his/her local library, playing selected ones to identify the desired sound. Often the musician uses a "nearest" sound file when search time (or patience of the musician) has been exhausted.

SUMMARY OF THE INVENTION

In one embodiment, a sound vendor uses a method to sell a sound file to a user of a digital audio workstation (DAW). The sound vendor receives the sound file from a sound creator and analyzes the sound file to automatically determine a beats-per-minute value and a musical key value. The sound file is stored, in association with the beats-per-minute value and the musical key value, within a database of the sound vendor. A web interface is generated to interact with the user to receive a search request defining at least one of the beats-per-minute value and the musical key value. The sound file is selected from the database based upon the search request, a financial agreement between the user and the sound creator is completed for sale of the sound file to the user, and the sound file is sent to the DAW.

In another embodiment, a sound vendor is coupled to the Internet for selling a sound file and includes a web interface, an analyzer, and a database. The web interface, executing within a server coupled with the Internet, receives at least one sound file. The analyzer, executing within the server, analyzes the sound file and determines a beats-per-minute value of the sound file and a musical key value of the sound file. The database, implemented within the server, stores the sound file in association with the beats-per-minute value and the musical key value. A plug-in loaded into a digital audio workstation interacts with the web interface to search the database for the sound file based upon at least one of the beats-per-minute value and the musical key value.

In another embodiment, a sound vendor uses a method to prepare at least one sound file of a sound creator for sale. The sound vendor receives from the sound creator, a sound file with a filename and a path name. The sound vendor executes a disaggregation tool to determine characteristics of the sound file. The disaggregation tool, when executed, performs the steps of: processing the filename to determine one or more of: a name of the sound file, a beats-per-minute value of the sound file, and a musical key value of the sound file; and storing the sound file in association with the name, the beats-per-minute value, and the musical key value, within a database. The sound file is selectable from the database based upon one or more of the name, the beats-per-minute value, and the musical key value.

In another embodiment, a sound vendor uses a method to sell a sound file to a user of a digital audio workstation. The sound vendor system receives a search request for a desired sound from a plug-in installed within the digital audio workstation. The search request has a sound category, a beats-per-minute value, and a musical key value. At least one sound file is selected from a database of sound files based upon the search request. Information identifying the selected sound files is sent to the plug-in for display to the user and a buy request identifying at least one of the selected sound files is received from the plug-in. A cost is determined based upon the buy request and the cost is sent to the plug-in for confirmation of purchase by the user. Payment information for purchase of the selected sound file is received from the plug-in, a financial transaction is performed based upon the cost and the payment information, and the identified sound files are sent to the plug-in if the financial transaction is successful.

In another embodiment, a software product includes instructions, stored on non-transitory computer-readable media, wherein the instructions, when executed by a digital processor, perform steps for selling a sound file. The software product includes instructions for receiving at least one sound file from a sound creator; instructions for analyzing the sound file to automatically determine a beats-per-minute value and a musical key value; instructions for storing, within a database, the sound file in association with the beats-per-minute value and the musical key value; instructions for generating a web interface that allows searching of the database and selecting the sound file based upon at least the beats-per-minute value and the musical key value; instructions for completing a financial agreement between the user and the sound creator for sale of the sample file to the user; and instructions for sending the sound file to a digital audio workstation (DAW) of the user.

In another embodiment, a software product includes instructions, stored on non-transitory computer-readable media, wherein the instructions, when executed by a computer, perform steps for interacting with a user of a digital audio workstation to select and download a sound file from a sound vendor. The software product includes instructions for interacting with a user of a digital audio workstation (DAW) to receive selection criteria of the sound file; instructions for cooperating, via a network, with the sound vendor to select the sound file from a plurality of sound files within a database; and instructions for cooperating, via the network, with the sound vendor to receive the sound file.

In another embodiment, a method is used to sell a sound file to a user of a digital audio workstation (DAW) by: interacting with the user, via the Internet, to receive a search request identifying one or more characteristics of the sound file, selecting, based upon the search request, the sound file from a database of sound files, receiving a payment for the sound file from the user, and sending the sound file to the DAW.

DETAILED DESCRIPTION

Definition of Terms

Sound Creator A sound creator creates sounds and stores them in sound files.
Sound File A sound file is an audio file containing a digital representation of a sound. The sound file has a format selected from the group including: AAC, AIF, MP3, WAV (PCM), and other audio formats known in the art.
Sound Vendor A sound vendor is an organization that sells sounds, in the form of sound files.
DAW A digital audio workstation (DAW) is used by a musician to create music from sound files.
BPM Beats per minute is a value defining the number of rhythmical beats per minute in a sound or song.
Musical Key A musical key identifies the tonic note and/or chord of a sound or song.

A sound vendor receives sound files from sound creators and makes these sound files available, online or on CDs for example, for purchase by musicians. The musicians utilize a DAW to compose and create a sound track from a plurality of sound files that are selected from the sound vendor. The systems and methods described herein advance the sound selling industry by providing improved ways for searching for and purchasing the sound files from within their DAW.

Figure 1:
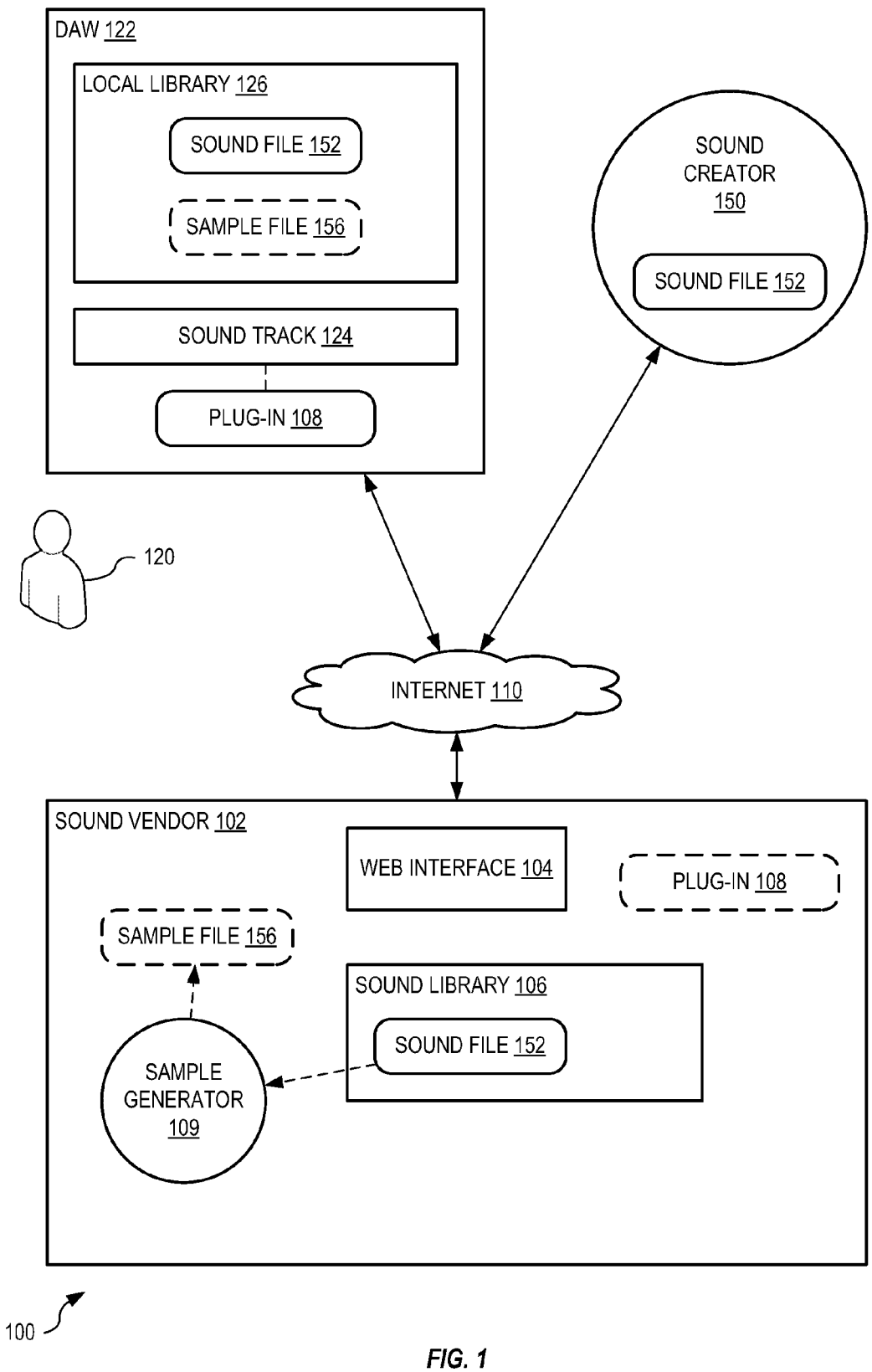
FIG. 1 shows one exemplary system for selling sounds, in an embodiment.

FIG. 1 shows one exemplary system 100 for selling sounds. System 100 includes a sound vendor 102 that has a web interface 104, a sound library 106, and a plug-in 108. Sound vendor 102 is for example implemented as one or more servers that utilize a digital processor to execute software, stored as machine readable instructions stored within non-transitory computer readable media (e.g., a memory), to implement functionality of sound vendor 102 as described herein. Web interface 104 provides access to sound vendor 102 via Internet 110. In one example, web interface 104 has one or more web pages that are accessible via Internet 110 to provide an interface to sound vendor 102. Sound library 106 is for example a database having programmed functionality to support storage, search, and retrieval of data.

A sound creator 150 creates a sound file 152 that has a digital representation of a sound. Sound file 152 may be stored using any one or more digital formats selected from the group including: AAC, AIF, MP3, WAV (PCM), and other audio formats known in the art. Sound file 152 represents a "loop" as used by a musician to create music in a DAW, for example. Sound creator 150 wishes to sell sound file 152 to musicians and uploads sound file 152, via Internet 110 and web interface 104, to sound vendor 102, where it is stored within sound library 106. Sound library 106 may contain many sound files, and sound vendor 102 optionally identifies each sound file in association with its creator.

A musician 120 uses a DAW 122 to create a sound track 124 (e.g., a song) by including and arranging one or more sound files. To facilitate access to online sound files of sound vendor 102, musician 120 downloads, via Internet 110 and web interface 104, plug-in 108 from sound vendor 102 and installs plug-in 108 for use within DAW 122. Plug-in 108 may be implemented as one or more of a VST, an AU, and a RTAS type plug-in, known in the art. In one example, DAW 122 is implemented as software executed by a processor of a personal computer and plug-in 108 is installed onto the computer and is accessible by DAW 122. Musician 120 may then access sound vendor 102 via plug-in 108 operating within DAW 122, Internet 110, and web interface 104, to search for sound files within sound library 106.

In one example of operation, musician 120 uses plug-in 108 to search for sound files of interest. Musician 120 may use plug-in 108 to apply searches and filters on sound files stored within sound library 106 of sound vendor 102, for example, until a selection of sound files of interest have been identified. Musician 120 may then use plug-in 108 to download a "sample" (e.g., sample file 156) of a selected sound file (e.g., sound file 152) for playing with sound track 124. For example, within DAW 122, the sample file 156, once downloaded from sound vendor 102, is played in synchronization with sound track 124 such that musician 120 may easily determine if sound file 152 is appropriate. If musician 120 determines that sound file 152 is appropriate for use in sound track 124, musician 120 may purchase sound file 152 from sound vendor 102 using plug-in 108, Internet 110, and web interface 104, wherein sound file 152 is downloaded from sound vendor 102 and stored in a local library 126 of DAW 122.

In one embodiment, sound vendor 102 includes a sample generator 109 that, when requested by plug-in 108, processes sound file 152 to generate sample file 156 that is similar to sound file 152 but with degraded quality. Sample file 156 includes similar metadata to sound file 152, and may be used within DAW 122 in a similar way to sound file 152. Sample generator 109 may use one or more algorithms to generate sample file 156 with degraded quality, as compared to sound file 152. In one embodiment, sample generator 109 uses a tempo-synced tremolo algorithm that applies a sinusoidal envelope to the source audio of sound file 152 at a frequency matching the tempo of sound file 152, such that the amplitude reduction is less noticeable in the sample. In another embodiment, sample generator 109 uses an algorithm to reduce the sample rate, bit depth, bit rate, etc., of sound file 152 to generate sample file 156. That is, sample file 156 is a reduced quality version of sound file 152. In another embodiment, sample generator 109 uses an algorithm to compress sound file 152 to generate sample file 156 with minimal quality reduction. That is, sample file 156 may have minimal compression compared to sound file 152 such that musician 120 may experience a higher quality experience when trying out sample file 156.

In one example of operation, musician 120 interacts with plug-in 108 to request a sample of sound file 152. Plug-in 108 interacts, via Internet 110 and web interface 104, with sound vendor 102 to request the sample, wherein sample generator 109 generates sample file 156 from sound file 152, using one or more of the above described algorithms. Sound vendor 102 then sends, via web interface 104 and Internet 110, sample file 156 to plug-in 108. Plug-in 108 may then automatically adjust sample file 156 to match parameters of sound track 124 such that sample file 156 is played in synchronization with sound track 124 within DAW 122.

When playing a sample or a purchased sound file (e.g., sound file 152) within sound track 124, plug-in 108 determines, by interacting with DAW 122, timing information of sound track 124, including a current play position within sound track 124 (e.g., a number of beats and/or bars), a beats-per-minute (BPM) value, and a sample rate. Plug-in 108 then calculates an appropriate sample offset within sound file 152 based upon this timing information. The sample offset is for example calculated using the current beats position modulo the total beats in sample file 152. Other methods and optimizations may be used to calculate the sample offset without departing from the scope hereof.

In one example of operation, musician 120 has an account with sound vendor 102 wherein plug-in 108 facilitates "log-in" of musician 120 to sound vendor 102, wherein sound vendor 102 maintains an account of financial transactions by musician 120. In another example, plug-in 108 cooperates with web interface 104, via Internet 110, to receive financial payment information from musician 120.

Figure 2:
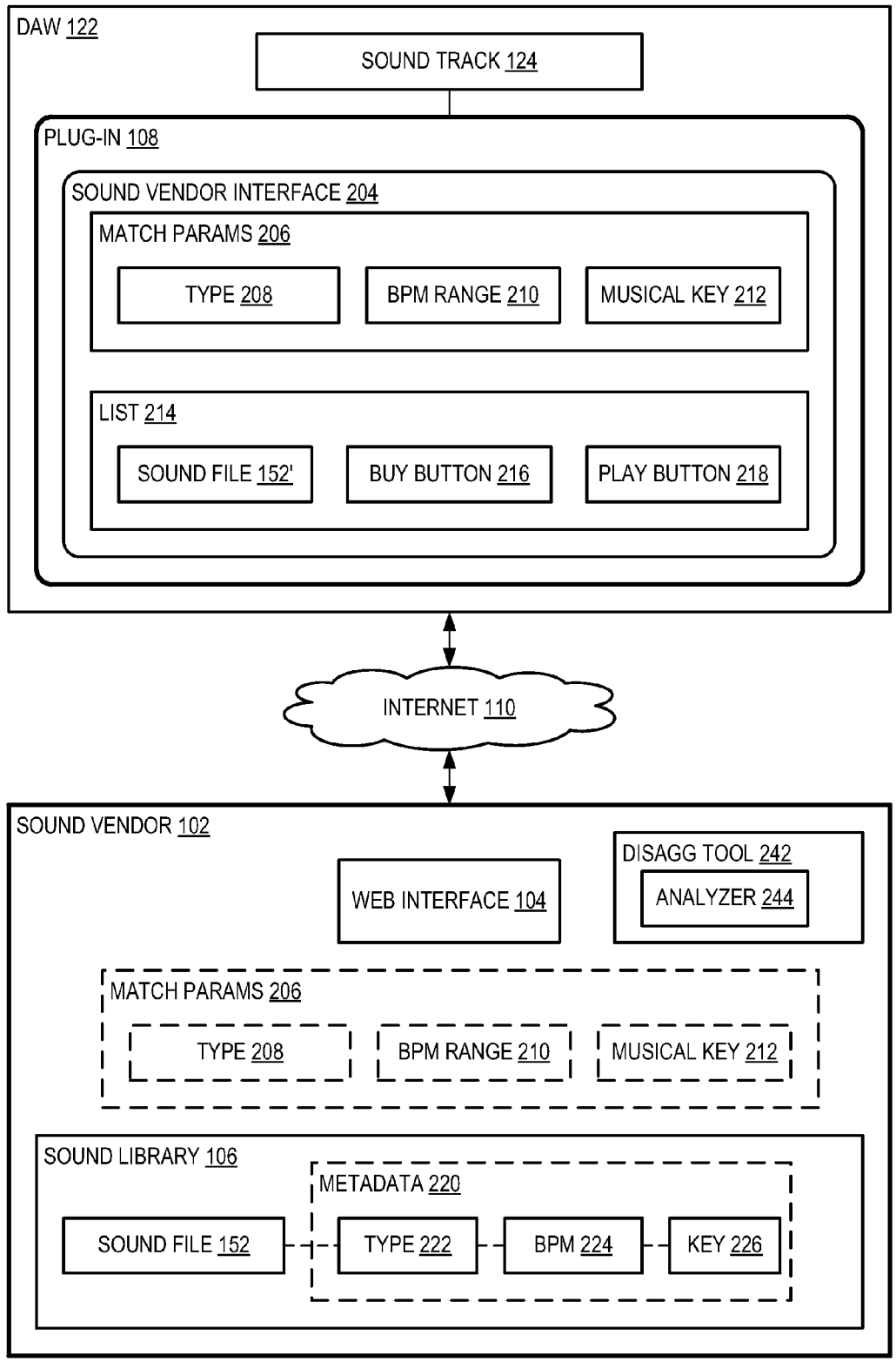
FIG. 2 shows the system of FIG. 1 illustrating exemplary interaction with the plug-in of the system of FIG. 1, operating within the DAW, to select and retrieve the sound file, in an embodiment.

FIG. 2 shows the system of FIG. 1 illustrating exemplary interaction between plug-in 108 of system 100, FIG. 1, and sound vendor 102, to select and retrieve sound file 152. Within DAW 122, the user interacts with sound vendor 102 via plug-in 108 to search for one or more sound files. For example, musician 120 may enter match parameters 206 that define a sound file being sought. Match parameters 206 are illustratively shown as a sound type 208, a BPM range 210, and a musical key 212. More or fewer parameters may be included within match parameters 206 without departing from the scope hereof. Within DAW 122, plug-in 108 creates a sound vendor interface 204 that interacts, via Internet 110, with web interface 104 of sound vendor 102.

In one embodiment, sound vendor interface 204 operates as a browser window, wherein web interface 104, via sound vendor interface 204, interacts with the musician (e.g., musician 120) to receive match parameters 206. In another embodiment, plug-in 108 generates sound vendor interface 204 that interacts with the musician (e.g., musician 120) to receive match parameters 206 and then transfers match parameters 206 to web interface 104 via Internet 110. Optionally, plug-in 108 may determine one or both of BPM range 210 and musical key 212 from sound track 124.

Within sound vendor 102, web interface 104 cooperates with sound library 106 to identify one or more sound files based upon match parameters 206. Sound library 106 is illustratively shown storing sound file 152 in association with metadata 220. Metadata 220 is derived from sound file 152 and/or information collected from sound creator 150.

Web interface 104 generates and displays, within sound vendor interface 204, a list of sound files that match parameters 206. For example, as shown in FIG. 2, list 214 includes an identifier for sound file 152, shown as sound file 152', and an associated buy button 216. If musician 120 clicks on buy button 216, purchase of the associated sound file (i.e., sound file 152) is initiated. Alternatively, musician 120 may select the sound file (e.g., by clicking identifier sound file 152') within list 214, and then select play within DAW 122 to have a sample of sound file 152 play in synchronization with sound track 124.

In one embodiment, sound vendor 102 maintains an account for each musician that stores financial information (e.g., credit card details) for completing a financial transaction. Musician 120 may purchase sound file 152 when logged into his account without the need to re-enter information for a credit card, or other purchase means for each purchase.

Figure 3:
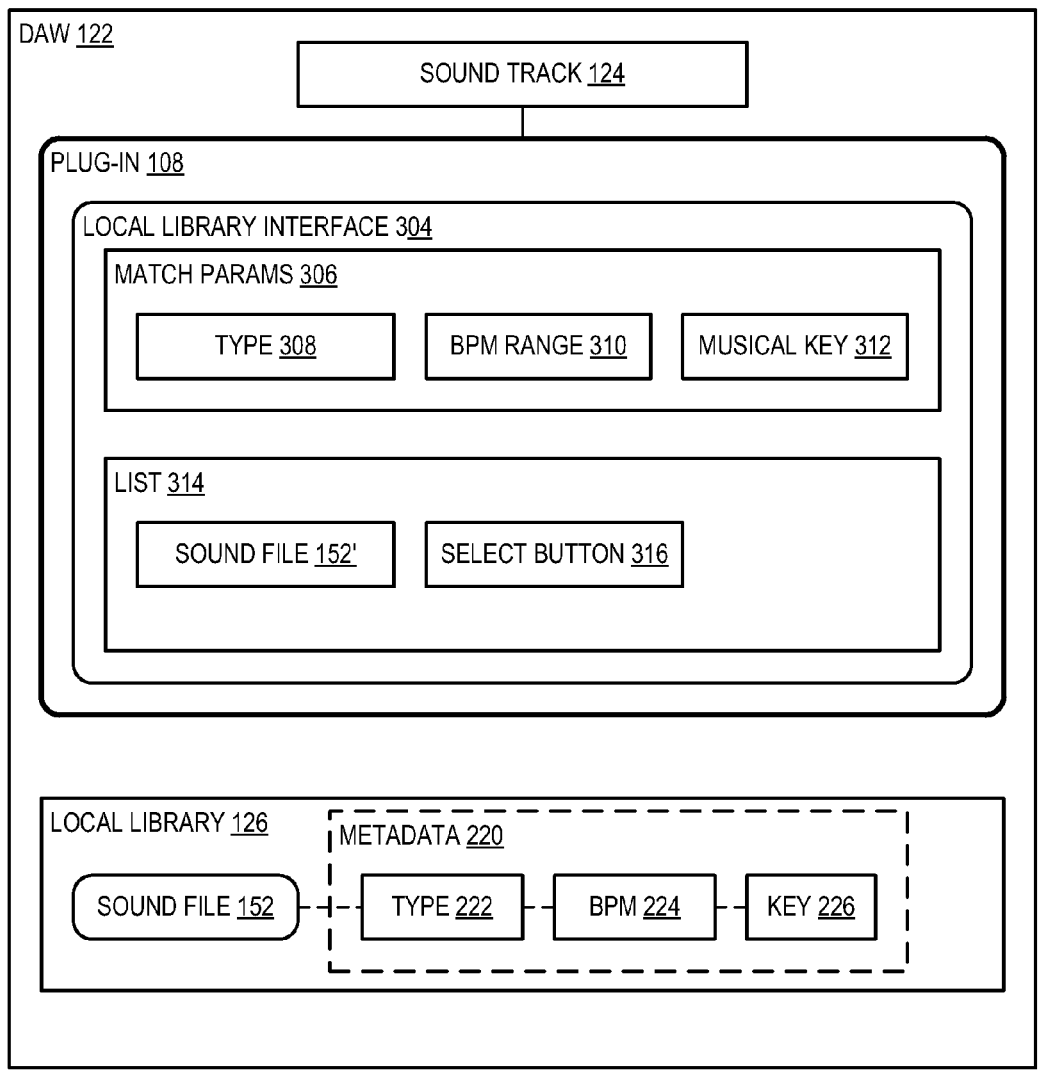
FIG. 3 shows the system of FIG. 1 illustrating exemplary use of the plug-in to manage sound files within a local library, in an embodiment.

FIG. 3 shows the system of FIG. 1 illustrating exemplary use of plug-in 108 to manage sound files within a local library 126. Where sound files are purchased from sound vendor 102, the sound files have associated metadata that is stored within local library 126 in association with the purchased sound file. Plug-in 108 allows musician 120 to use searches and filters to identify sound files of interest within local library 126. In the example of FIG. 3, local library 126 stores sound file 152, purchased from sound vendor 102 as described with respect to FIG. 2. Local library 126 also stores metadata 220 in association with sound file 152. Plug-in 108 displays a local library interface 304 that allows musician 120 to enter match parameters 306 that may include one or more of a sound type 308, a BPM range 310, and a musical key 312. Plug-in 108 then selects one or more sound files stored within local library 126 based upon match parameters 306 and displays indications of these sound files within a list 314 of local library interface 304. In the example of FIG. 3, sound file 152 is selected within local library 126 based upon match parameters 306, and plug-in 108 displays an indication of sound file 152 as sound file 152' together with a select button 316. Musician 120 clicks selection button 316 to indicate that sound file 152 is of interest, and may then play a sample of sound file 152 in synchronization with sound track 124. If musician 120 determines that sound file 152 is suitable for use within sound track 124, musician 120 may load and further process sound file 152 within DAW 122.

Since, within plug-in 108, local library interface 304 and sound vendor interface 204 of FIG. 2, have similar user interfaces, musician 120 has a consistent experience when finding sound files within both online sound library 106 and local library 126.

Figure 4:
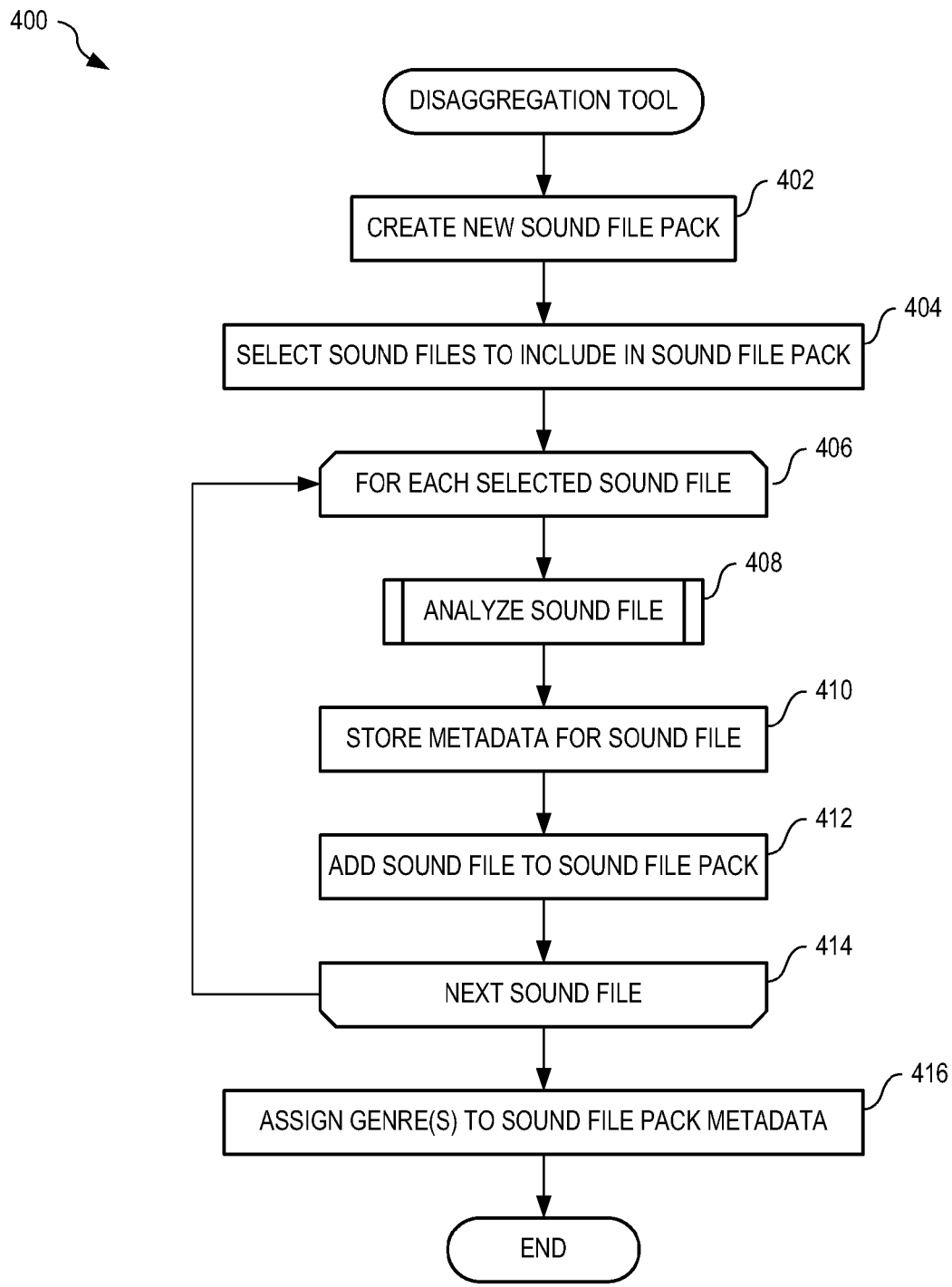
FIG. 4 is a flowchart illustrating one exemplary method for preparing sound files for storage and sale by a sound vendor, in an embodiment.
Figure 5:
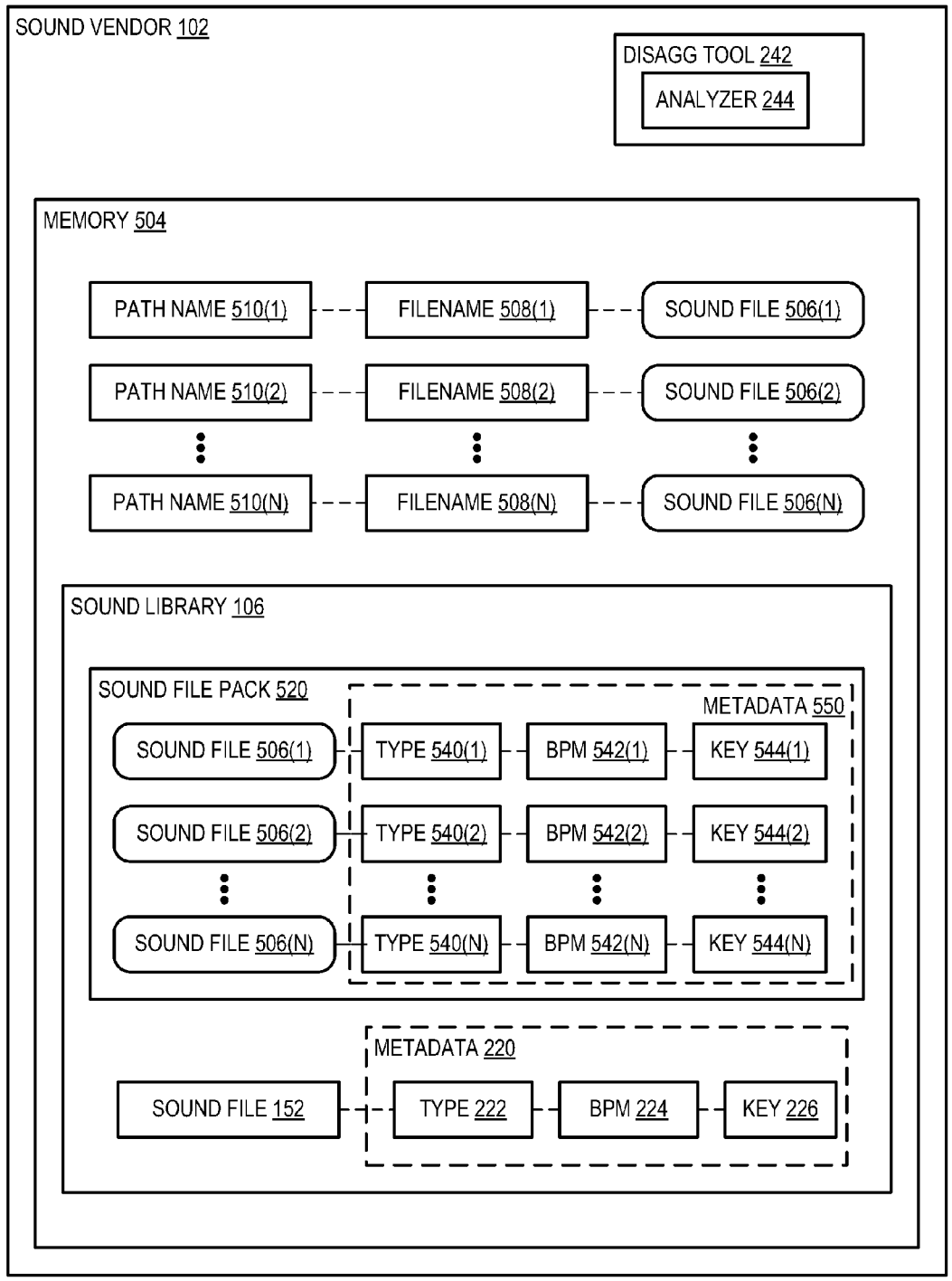
FIG. 5 is a schematic illustrating exemplary operation of the disaggregation tool within the sound vendor of FIG. 1 to process sound files received from the sound creator, in an embodiment.

FIG. 4 is a flowchart illustrating one exemplary method 400 for preparing sound files (e.g., sound file 152) for storage and sale by sound vendor 102 of system 100, FIG. 1. Method 400 is for example implemented within disaggregation tool 242 of FIG. 2. FIG. 5 is a schematic illustrating exemplary operation of disaggregation tool 242 to process sound files 506(1)-(N) received from sound creator 150. FIGS. 4 and 5 are best viewed together with the following description.

Sound creators (e.g., sound creator 150) typically produce a plurality of sound files (e.g., sound file 152) that they group into packs and offer for sale. Typically, these sound packs are not well organized and do not contain metadata for each sound file; therefore, classification, searching, and filtering of those sound files is not possible.

Within sound vendor 102, disaggregation tool 242, using method 400, processes uploaded sound files 506, filenames 508 and path names 510 to generate metadata 550 such that each sound file may be stored within sound library 106 and is easily identified by searching, filtering, and so on. In one example of operation, sound developer 152 uploads one or more sound files 506 to sound vendor 102 where they are stored within memory 504. Memory 504 is also shown storing sound library 106, however, sound library 106 may be stored within a different memory of sound vendor 102 without departing from the scope hereof.

Disaggregation tool 242 is a software application and comprises computer readable instructions that are executed by a processor of sound vendor 102. Memory 504 may represent one or both of volatile memory and non-volatile memory, such as found in computer systems. For example, memory 504 may represent a hard drive containing a file structure for storing sound files 506. Sound files 506 may represent sound file 152 of FIG. 1.

In the example of FIG. 5, sound files 506 are stored with a filename 508 and a file path 510 that is uploaded from sound creator 150 and is assigned an audio type (e.g., a loop, a sound effect (SFX), and a sample, where SFX files do not have a key value and sample files do not have BPM value). For each sound file 506, sound creator 150 creates filename 508 to describe the created sound stored within sound file 506, and may store that sound file within a file structure where path name 510 also describes characteristics (e.g., duration and file format details) of that sound file. For example, sound vendor 150 may give a file name of "electric guitar c-major 120 BPM" to a sound file characterized as having a sound created from an electric guitar in the key of C major and a speed of 120 BPM. In another example, sound creator 150 may collectively store sound files having a musical key value of C major within a folder called "C Major". Similarly, sound creator 150 may store sound files having a speed of 120 BPM in a folder called "120 BPM". Also, such folders may be nested, such that folder "120 BPM" may be within the folder called "C Major" and used for storing sample files 506 that are characterized as having sounds in a musical key of C major and a speed of BPM of 120.

Disaggregation tool 242 includes an analyzer 244 that automatically determines metadata of each sound file 506 from one or both of filename 508 and path name 510 of the sound file. In one embodiment, when the filename and file path do not contain information suitable for use within the metadata, analyzer 244, which is an algorithm formed of computer readable instructions that are executable by a processor to processes the data of the sound file to determine a musical key value and a BPM of the sound.

In step 402, method 400 creates a new sound file pack. In one example of step 402, disaggregation tool 242 creates a sound file pack 520 within memory 504. In step 404, method 400 selects the sound files for inclusion within the sound file pack. In one example of step 404, disaggregation tool 242 automatically selects sound files 506(1)-(N) that are uploaded to sound vendor 102 from sound creator 150.

Steps 406 through 414 are a loop that steps through each selected sound file of step 404. In step 408, method 400 analyzes the sound file to determine metadata of the sound file. In one example of step 408, disaggregation tool 242 invokes analyzer 244 to determine at least BPM value 542(1) and musical key value 544(1) for sound file 506(1). In step 410, method 400 stores the metadata for the sound file within the sound file pack. In one example of step 410, disaggregation tool 242 stores BPM value 542 and musical key value 544 within sound file pack 520. In step 412, method 400 adds the sound file to the sound file pack. In one example of step 412, disaggregation tool 242 adds sound file 506(1) to sound file pack 520. Steps 406 through 414 repeat for each remaining selected sound file.

In step 416, method 400 assigns genres to sound file pack metadata. In one example of step 416, disaggregation tool 242 interacts with sound creator 150 to receive genre information for sound file 506(1) and stores that genre information as type 540(1). As shown in FIG. 5, sound file pack 520 is stored within sound library 106 and may be selected for purchase by musician 120, and/or individual sound files 506 therein may be selected for purchase by musician 120. In one embodiment, disaggregation tool 242 and/or analyzer 244 provides an interactive window with predefined genres, and optionally sub-genres, for selection by sound creator 150 to interactively define metadata 550.

In one example of operation, sound file 506(1) has a play length of 7.68 seconds, its pathname 510(1) is "/Users/clark/Documents/samples/Rock Collection/Vocals/" and its filename 508(1) is "nd_vox125_melo_D#m.way." Disaggregation tool 242 determines that the title of the sound file is "Nd Vox Melo", that is has a BPM value of 125.0, is 16 beats in length, has a key value of "D#" and a progression of "D#m."

After each sound file 506 is received by sound vendor 102, it is automatically analyzed by disaggregation tool 242 and ready for final verification. Final verification is optionally a manual process where a human manager of sound vendor 102 interactively verifies each sound and associated metadata 550, and then determines sound file pack 520 is ready for use.

Figure 6:
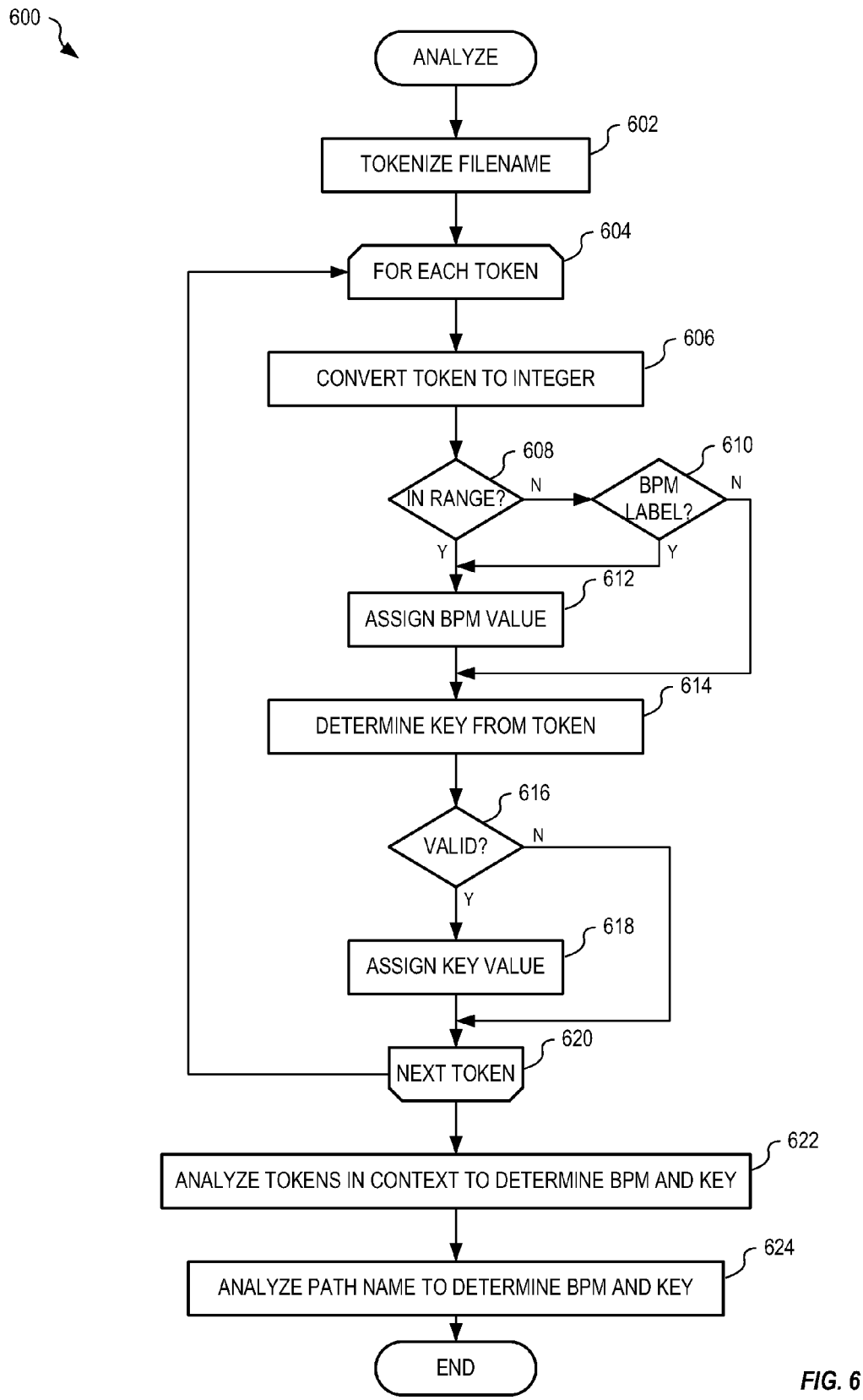
FIG. 6 is a flowchart illustrating one exemplary method for analyzing a filename and a path name of the sound files of FIG. 5 to automatically generate metadata, in an embodiment.

FIG. 6 is a flowchart illustrating one exemplary method 600 for analyzing filename 508 and path name 510 of sound file 506 to automatically generate metadata 550. Method 600 is implemented within analyzer 244, for example.

In step 602, method 600 tokenizes a filename of a sound file. In one example of step 602, analyzer 244 tokenizes filename 508(1) of sound file 506(1) and identifies a plurality of tokens (e.g., "nd", "vox125", "melo", and "D#m"). Steps 604 through 620 form a loop that is repeated for each determined token of step 602. In step 606, method 600 converts the token into an integer value. In one example of step 606, analyzer 244 uses a string to integer function to convert the characters of the token "vox125" into an integer value of 125.

Step 608 is a decision. If, in step 608, method 600 determines that the integer value is within a predefined range for a BPM value (e.g., 50-190 BPM) then method 600 continues with step 612; otherwise method 600 continues with step 610. Step 610 is a decision. If, in step 610, method 600 determines that the token includes a "BPM" label, method 600 continues with step 612; otherwise method 600 continues with step 614.

In step 612, method 600 assigns the integer value of step 606 to represent the BPM value. In one example of step 612, analyzer 244 stores the integer value "125", determined in step 606, in BPM value 542(1) of metadata 550. In step 614, method 600 determines a musical key value from the token. In one example of step 614, method 600 compares the token to each of a plurality of predefined key value strings, wherein a match indicates a key value of the sound file. For example, the Key Value of "C#" is determined from each of the following tokens: "db", "dbm", "dbmin", "dbmaj", "db7", "c#", "c#m", "c#min", "c#maj", "c#7", "dflat", "dflatm", "dflatmin", "dflatmaj", "dflat7", "csharp", "csharpm", "csharpmin", "csharpmaj", and "csharp7".

Step 616 is a decision. If, in step 616, method 600 determines that the token represents a valid key value (e.g., a match is made between the token and the predefined key value strings), method 600 continues with step 618; otherwise method 600 continues with step 620. In step 618, method 600 assigns the determined key value to the sound file. In one example of step 618, analyzer 244 stores the determined key value of step 614 to key value 544(1) of sound file 506(1) within metadata 550. Steps 604 through 620 repeat for remaining tokens of the filename.

In step 622, further analysis of the filename is performed to analyze each token within the context of adjacent tokens to further determine a BPM value and a key value for the sound file. In step 624, method 600 analyzes the path name of the sound file to determine a BPM and/or a key value. For example, if tokens determined from file name 508(1) do not result in a probably BPM and/or a key value, path name 510(1) is similarly tokenized and processed by disaggregation tool 242 to identify one or both of the BPM value and the key value that was not determined from the filename 508(1).

Figure 7:
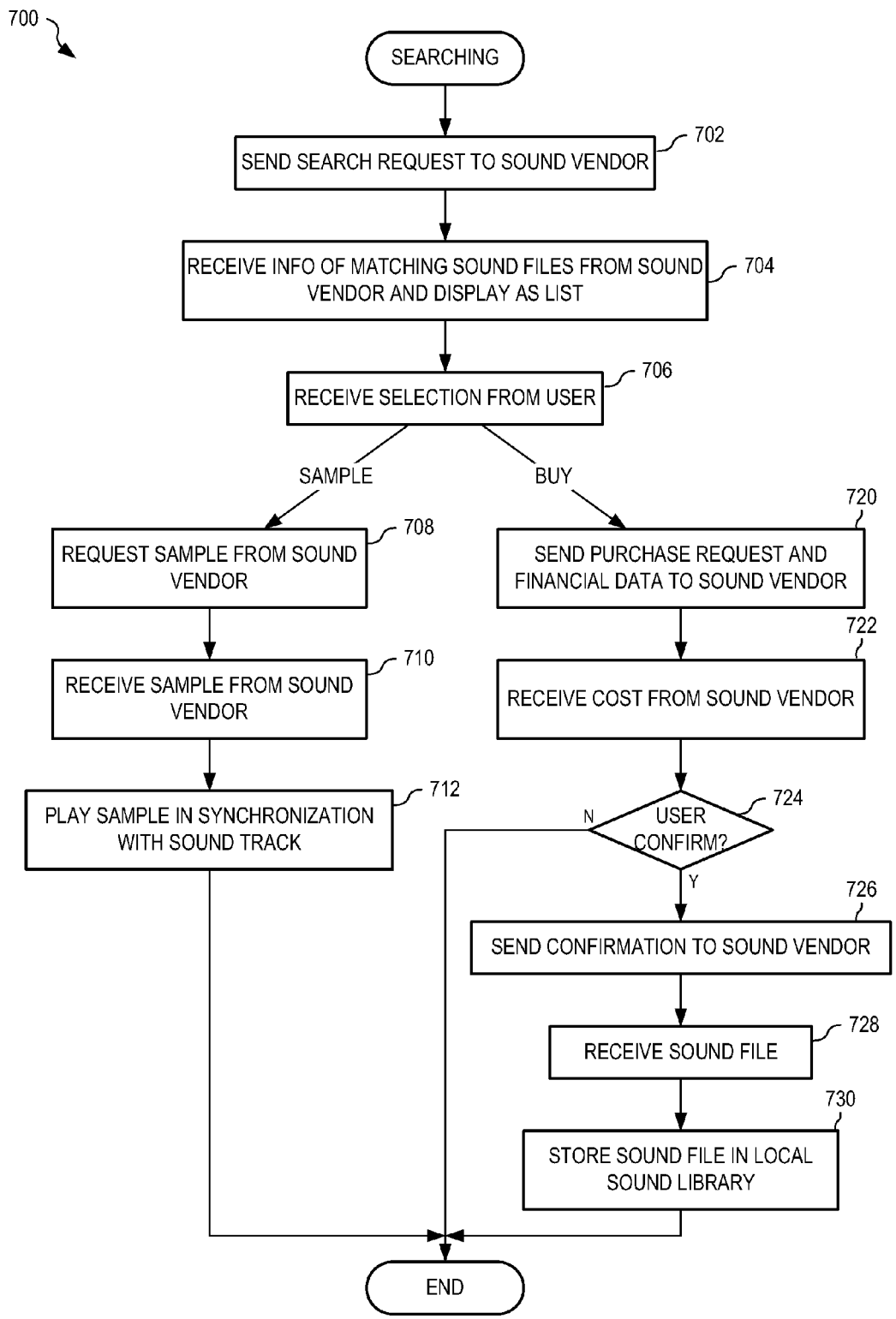
FIG. 7 is a flowchart illustrating one exemplary method for purchasing a sound file using the plug-in of FIG. 1.

FIG. 7 is a flowchart illustrating one exemplary method 700 for purchasing a sound file using plug-in 108 of FIG. 1. Method 700 is implemented within plug-in 108, for example. In step 702, method 700 sends a search request to a sound vendor. In one example of step 702, plug-in 108 sends match parameters 206, entered by musician 120, to sound vendor 102 via Internet 110 and web interface 104. In step 704, method 700 receives information of matching sound files from the sound vendor and displays the sound files as a list. In one example of step 704, plug-in 108 receives information of sound file 152 from sound vendor 102 and displays the information within list 214 to musician 120. In step 706, method 700 receives a selection from the musician. In one example of step 706, plug-in 108 receives notification of musician 120 clicking on buy button 216 associated with displayed information of sound file 152'. Method 700 continues with step 708 if the received selection indicates that a sample is requested and with step 720 is the received selection indicates that a purchase is requested.

In step 708, method 700 requests a sample of the selected sound file from the sound vendor. In one example of step 708, plug-in 108 requests a sample of sound file 152 from sound vendor 102. In step 710, method 700 receives a sample from the sound vendor. In one example of step 710, plug-in 108 receives a sample of sound file 152 from sound vendor 102. In step 712, method 700 plays the sample in synchronization with a sound track. In one example of step 712, plug-in 108 cooperates with DAW 122 to play the sample in synchronization with sound track 124.

Steps 706 through 712 may repeat to allow the musician to sample other sound files. Steps 702 and 704 may also repeat to allow musician 120 to change match parameters 206 to select other sound files.

In step 720, method 700 sends a purchase request and financial data to the sound vendor. In one example of step 720, plug-in 108 sends a purchase request for sample file 152 together with financial data of musician 120 to sound vendor 102. In one example, plug-in 108 may request credit card information from musician 120 to send as financial data. In another example, musician 120 has an account with sound vendor 102 and plug-in 108 sends login information to sound vendor 102. In step 722, method 700 receives a cost from the sound vendor. In one example of step 722, plug-in 108 receives a cost for purchase of sound file 152 from sound vendor 102 and displays the cost to musician 120 for approval of the purchase. Step 724 is a decision. If, in step 724, method 700 receives a confirmation of the purchase from the musician, method 700 continues with step 726; otherwise method 700 ends and repeats steps 702 through 724.

In step 726, method 700 sends a confirmation to sound vendor 102. In one example of step 726, plug-in 108 sends a confirmation of the purchase of sound file 152 to sound vendor 102. In step 728, method 700 receives the sound file. In one example of step 728, plug-in 108 receives sound file 152 from sound vendor 102 after sound vendor 102 has verified the financial data. In step 730, method 700 stores the sound file in the local sound library. In one example of step 730, plug-in 108 stores sound file 152 within sound library 126 of DAW 122. Steps 706 and 720 through 730 may repeat for other purchases by musician 120.

Steps 702 through 730 may repeat to allow musician 120 to sample and purchase other sound files.

Figure 8:
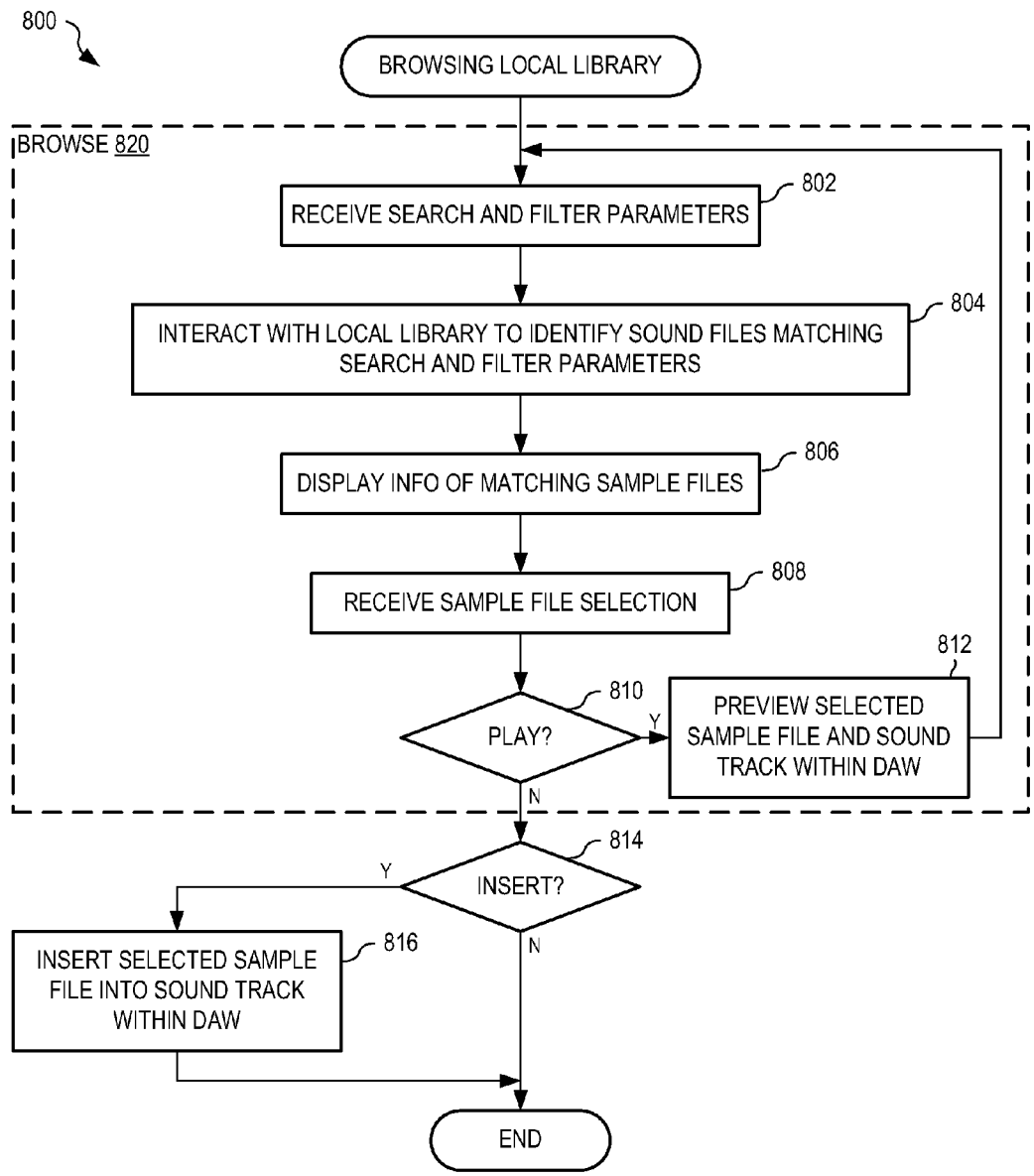
FIG. 8 is a flowchart illustrating one exemplary method for browsing sound files within a local library using the plug-in of FIG. 1, in an embodiment.

FIG. 8 is a flowchart illustrating one exemplary method 800 for browsing sound files within local library 126 using plug-in 108 of FIG. 1, in an embodiment. Method 800 is implemented within plug-in 108 for example. In step 802, method 800 receives search and filter parameters. In one example of step 802, plug-in 108 interacts with musician 120 to receive match parameters 206 that define one or more of type 208, BPM range 210, and musical key 212. In step 804, method 800 interacts with the local library to identify sound files matching the search and filter parameters. In one example of step 804, plug-in 108 interacts with local library 126 to identify sound file 152 based upon match parameters 206. In step 806, method 800 displays information of the matching sound files. In one example of step 806, plug-in 108 displays list 314 containing sound file 152' of local library 126 together with select button 316.

In step 808, method 800 receives a sample file selection. In one example of step 808, plug-in 108 receives an event indicating that musician 120 has clicked on play button 218.

Step 810 is a decision. If, in step 810, method 800 determines that the musician clicked on the play button, method 800 continues with step 812; otherwise method 800 continues with step 814. In step 812, method 800 previews the selected sample file and sound track within the DAW. In one example of step 812, plug-in 108 cooperates with DAW 122 to play sound file 152 in synchronization with sound track 124. Method 800 then repeats one or more of steps 802 through 812 to sample additional sound files.

Step 814 is a decision. If, in step 814, method 800 determines that the musician has requested to insert the selected sound file, method 800 continues with step 816; otherwise method 800 optionally repeats one or more of steps 802 through 816. In step 816, method 800 inserts the selected sound file into the sound track within the DAW. In one example of step 816, plug-in 108 inserts sound file 152 into sound track 124 within DAW 122. One or more of steps 802 through 816 may repeat to play sample files and to add sample files to sound track 124.

Functionality of plug-in 108 may also be incorporated directly within DAW 122 such that functionality of plug-in 108 is includes within DAW 122. Also, competitors may integrate the shopping experience directly into hardware (e.g., professional music production equipment and DJ hardware). For example, a DJ controller may integrate a shopping experience directly into its user interface.

Further Embodiments

Future music production systems may have unlimited sounds for selection by a musician. Instead of using a web browser, the musician purchases creative tools, sounds, and music directly from within the composition environment. These tools guide composers, DJ's, sound designers, and other musicians to discover sound files for use within their sound tracks, thereby enhancing workflow during the creative process. The use of plug-in 108, or the equivalent built-in functionality, within the composition environment in cooperation with sound vendor 102, allows musician 120 to easily find desired sounds (e.g., sound file 152) within the unlimited sound sources of the future.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

- A. A method for selling a sound file to a user of a digital audio workstation (DAW), comprising: receiving, within a sound vendor, the sound file from a sound creator; analyzing the sound file to automatically determine a beats-per-minute value and a musical key value; storing the sound file in association with the beats-per-minute value and the musical key value within a database of the sound vendor; generating a web interface to interact with the user to receive a search request defining at least one of the beats-per-minute value and the musical key value; selecting the sound file from the database based upon the search request; completing a financial agreement between the user and the sound creator for sale of the sound file to the user; and sending the sound file to the DAW.
- B. The method of embodiment A, further comprising: presenting a plurality of matching sound files, including the sound file, to the user; and interactively receiving a selection of the sound file from the user.
- C. The method of embodiment A or B, wherein the beats-per-minute value and the musical key are automatically determined by the sound vendor from one or both of a filename and a path name of the sound file.
- D. The method of embodiments A through C, further comprising, prior to completing the financial agreement, sending a sample of the sound file to the DAW, wherein the sample is manipulated to match a beats-per-minute value and a musical key of a sound track within the DAW and then played with the sound track.
- E. The method of embodiments A through D, wherein the DAW includes a plug-in to facilitate communication between the DAW and the sound vendor.
- F. The method of embodiments A through E, wherein the steps are implemented as instructions, stored on computer readable media, and executed by a computer.
- G. A sound vendor coupled to the Internet for selling a sound file, comprising: a web interface, executing within a server coupled with the Internet, for receiving at least one sound file; an analyzer, executing within the server, for analyzing the sound file and determining a beats-per-minute value of the sound file and a musical key value of the sound file; and a database, implemented within the server, for storing the sound file in association with the beats-per-minute value and the musical key value; wherein a plug-in loaded into a digital audio workstation interacts with the web interface to search the database for the sound file based upon at least one of the beats-per-minute value and the musical key value.
- H. The sound vendor of Embodiment G, further comprising a disaggregation tool, implemented within the server, for combining a plurality of sound files into a pack and for defining metadata associated with the pack, wherein the metadata defines a musical key value and a beats-per-minute value of each sound file within the pack.
- I. A method for preparing at least one sound file of a sound creator for sale by a sound vendor, comprising: receiving, within the sound vendor and from the sound creator, a sound file with a filename and a path name; executing, within the sound vendor, a disaggregation tool to determine characteristics of the sound file, the disaggregation tool, when executing, performing the steps of: processing the filename to determine one or more of: a name of the sound file, a beats-per-minute value of the sound file, and a musical key value of the sound file; and storing the sound file in association with the name, the beats-per-minute value, and the musical key value, within a database; wherein the sound file is selectable from the database based upon one or more of the name, the beats-per-minute value, and the musical key value.
- J. The method of embodiment I, wherein the step of receiving comprises receiving a plurality of sound files from the sound vendor, each sound file having a filename and a path name; the step of executing comprising executing the disaggregation tool to determine characteristics for each of the sound files; and further comprising the step of: storing each of the sound files within a sound file pack together with the associated characteristics.
- K. A method for selling a sound file to a user of a digital audio workstation, comprising: receiving, within a sound vendor system, a search request for a desired sound from a plug-in installed within the digital audio workstation, the search request having a sound category, a beats-per-minute value, and a musical key value; selecting, based upon the search request, at least one sound file from a database of sound files; sending information identifying the selected sound files to the plug-in for display to the user; receiving a buy request from the plug-in identifying at least one of the selected sound files; determining a cost based upon the buy request; sending the cost to the plug-in for confirmation of purchase by the user; receiving payment information for purchase of the selected sound file from the plug-in; performing a financial transaction based upon the cost and the payment information; and sending the identified sound files to the plug-in if the financial transaction is successful.
- L. A software product comprising instructions, stored on non-transitory computer-readable media, wherein the instructions, when executed by a digital processor, perform steps for selling a sound file, comprising: instructions for receiving at least one sound file from a sound creator; instructions for analyzing the sound file to automatically determine a beats-per-minute value and a musical key value; instructions for storing, within a database, the sound file in association with the beats-per-minute value and the musical key value; instructions for generating a web interface that allows searching of the database and selecting the sound file based upon at least the beats-per-minute value and the musical key value; instructions for completing a financial agreement between the user and the sound creator for sale of the sample file to the user; and instructions for sending the sound file to a digital audio workstation (DAW) of the user.

M. A software product comprising instructions, stored on non-transitory computer-readable media, wherein the instructions, when executed by a computer, perform steps for interacting with a user of a digital audio workstation to select and download a sound file from a sound vendor, comprising: instructions for interacting with a user of a digital audio workstation (DAW) to receive selection criteria of the sound file; instructions for cooperating, via a network, with the sound vendor to select the sound file from a plurality of sound files within a database; and instructions for cooperating, via the network, with the sound vendor to receive the sound file.

N. A method for selling a sound file to a user of a digital audio workstation (DAW), comprising: interacting with the user, via the Internet, to receive a search request identifying one or more characteristics of the sound file; selecting, based upon the search request, the sound file from a database of sound files; receiving a payment for the sound file from the user; and sending the sound file to the DAW.

O. The method of embodiment N, wherein the step of receiving comprises receiving authorization from the user to take payment from a previously agreed financial source.

P. The method of embodiment N or O, further comprising interacting with the user to select the sound file from a plurality of sound files identified with in the database as matching the search request.

Q. The method of embodiment N through P, wherein the step of receiving comprises receiving payment information for purchase of the selected sound file from the user.

R. The method of embodiments N though Q, wherein the characteristics define one or more of a sound category, a beats-per-minute value, and a musical key value.

S. The method of embodiments N through R, wherein the step of interacting comprises interacting with a plug-in installed within the DAW.

What is claimed is:

1. A method for selling a digital sound file to a user of a digital audio workstation (DAW) used to create and modify a sound track, comprising:
   receiving, within a sound vendor computer server remote from the DAW, the digital sound file from a sound creator;
   analyzing, within a disaggregation tool of the sound vendor computer server, the digital sound file to automatically determine a beats-per-minute value (BPM) and a musical key value;
   storing the sound file in association with the BPM value and the musical key value within a database of the sound vendor computer server;
   sending a sample of the sound file from the sound vendor computer server to the DAW, the sample being synchronized by a plug-in, installed onto the DAW, to match a beats-per-minute value and a musical key of a sound track within the DAW and then played with the sound track; and
   during creation of the sound track within the DAW by the user:
      receiving, at the sound vendor computer server and via the Internet, a search request from the plug-in defining match parameters identified by the plug-in from the sound file, the match parameters including one or more of a desired sound category, a desired BPM range, and a desired musical key, the search request based upon timing information of the sound track determined by the plug-in by interacting with the DAW;
      retrieving, based on the search request, the sound file from the database of the sound vendor computer server; and
      sending, via the Internet and the plug-in, the sound file to the DAW for playing with the sound track within the DAW.

2. The method of claim 1, further comprising:
   presenting, within the DAW via the plug-in, a plurality of matching sound files from the sound vendor computer server, including the sound file, to the user; and
   interactively receiving a selection of the sound file from the user via the plug-in.

3. The method of claim 1, wherein the beats-per-minute value and the musical key are automatically determined by the sound vendor computer server from one or both of a filename and a path name of the sound file.

4. The method of claim 1, wherein the steps are implemented as instructions, stored on computer readable media, and executed by a computer.

5. A sound vendor coupled to the Internet for selling a sound file, comprising:
   a web interface, executing within a server coupled with the Internet, for receiving at least one sound file from a sound creator;
   an analyzer, executing within the server, configured to analyze the sound file and determine a beats-per-minute value of the sound file and a musical key value of the sound file; and
   a database, implemented within the server, for storing the sound file in association with the beats-per-minute value and the musical key value;
   the web interface adapted to interact with a plug-in loaded into a digital audio workstation adapted for creation of a sound track and located remotely from the web server, to search the database for the sound file based upon at least one of the beats-per-minute value and the musical key value, and transmit the sound file to the plug-in such that the plug-in plays the sound track with the sound file during creation of the sound track.

6. The sound vendor of claim 5, further comprising a disaggregation tool, implemented within the server, for combining a plurality of sound files into a pack and for defining metadata associated with the pack, wherein the metadata defines a musical key value and a beats-per-minute value of each sound file within the pack.

7. A software product comprising instructions, stored on non-transitory computer-readable media, wherein the instructions, when executed by a digital processor, perform steps for selling a sound file, comprising:
   instructions for receiving at least one sound file from a sound creator;
   instructions for analyzing the sound file to automatically determine a beats-per-minute value and a musical key value;
   instructions for storing, within a database, the sound file in association with the beats-per-minute value and the musical key value;
   instructions for generating a web interface that allows searching of the database, based on a search request, and selecting the sound file based upon at least the beats-per-minute value and the musical key value;

instructions for sending a sample of the sound file to the DAW, the sample being synchronized by a plug-in downloaded on the DAW to match a beats-per-minute value and a musical key of a sound track within the DAW and then played with the sound track; and, instructions for sending the sound file to a digital audio workstation (DAW) of the user, the DAW having a plug-in downloaded thereon and being adapted to create and modify a sound track using the sound file, the search request defining match parameters identified by the plug-in from the sound file, the match parameters including one or more of a desired sound category, a desired BPM range, and a desired musical key, the search request based upon timing information determined by the plug-in interacting with the DAW.

8. The software product of claim 7, further comprising:

instructions for presenting a plurality of matching sound files, including the sound file, to the user via the plug-in; and instructions for interactively receiving a selection of the sound file from the user.

9. The software product of claim 7, further comprising instructions for automatically determining the beats-per-minute value and the musical key from one or both of a filename and a path name of the sound file.

10. The software product of claim 7, further comprising instructions for sending a plug-in from the sound vendor to the DAW, wherein the DAW communicates with the sound vender via the plug-in.

* * * * *